United States Patent
Alis et al.

(10) Patent No.: US 8,292,233 B2
(45) Date of Patent: Oct. 23, 2012

(54) SOLAR PROTECTION DEVICE FOR SPACE INSTRUMENT

(75) Inventors: Claude Alis, La Roquette sur Siagne (FR); Jacques Vieillot, Cannes la Bocca (FR)

(73) Assignee: Thales, Neuilly sur Siene (FR)

( * ) Notice: Subject to any disclaimer, the term of this patent is extended or adjusted under 35 U.S.C. 154(b) by 584 days.

(21) Appl. No.: 12/167,346

(22) Filed: Jul. 3, 2008

(65) Prior Publication Data
US 2009/0065647 A1  Mar. 12, 2009

(30) Foreign Application Priority Data

Jul. 24, 2007 (FR) .................................... 07 05377

(51) Int. Cl.
*B64G 1/54* (2006.01)
(52) U.S. Cl. .................................................. 244/171.7
(58) Field of Classification Search .............. 244/171.7, 244/171.8, 171, 158.1; 359/811
See application file for complete search history.

(56) References Cited

U.S. PATENT DOCUMENTS

| | | | | |
|---|---|---|---|---|
| 3,791,713 A | * | 2/1974 | Mackay | 359/430 |
| 4,116,263 A | * | 9/1978 | Ganssle et al. | 250/453.11 |
| 4,162,701 A | * | 7/1979 | Ollendorf | 165/273 |
| 6,199,988 B1 | * | 3/2001 | Krawczyk | 359/601 |
| 7,631,839 B1 | * | 12/2009 | Duncan et al. | 244/158.1 |

FOREIGN PATENT DOCUMENTS

| | | |
|---|---|---|
| EP | 1179474 | 2/2002 |
| FR | 2658783 | 8/1991 |

OTHER PUBLICATIONS

Petersen, H. et al. "Passive Cryogenic Cooler for MSG Seviri Design and Performance." European Symposium on Space Environmental Control Systems, XX, XX, vol. 2, May 20, 1997, pp. 523-531, XP000998244.

* cited by examiner

*Primary Examiner* — Timothy D Collins
*Assistant Examiner* — Brian M O'Hara
(74) *Attorney, Agent, or Firm* — Lowe, Hauptman, Ham & Berner, LLP

(57) ABSTRACT

The present invention relates to a solar protection device for space instrument. This invention is particularly suited to electromagnetic measuring instruments pointing in a direction close to that of the sun. To ensure the continuous availability, the performance and the non-degradation of collecting instruments directed towards the sun, the invention proposes the use of solar baffling thermally and mechanically decoupled from the platform supporting the collecting instruments of the equipment.

11 Claims, 5 Drawing Sheets

SOLAR PROTECTION DEVICE FOR SPACE INSTRUMENT

RELATED APPLICATIONS

The present application is based on, and claims priority from, French Application Number 07 05377, filed Jul. 24, 2007, the disclosure of which is hereby incorporated by reference herein in its entirety.

TECHNICAL FIELD

The present invention relates to a solar protection device for a space instrument. This invention is particularly suited to electromagnetic measuring instruments pointing in a direction close to that of the sun.

BACKGROUND OF THE INVENTION

Specifically, it is known that direct solar illumination on an electromagnetic radiation collecting system gives rise to thermoelastic deformations of the latter; thereby rendering it inoperative during certain periods. It is even possible for direct electromagnetic radiation to cause irreversible degradations, or indeed the destruction of the instrument by thermal heating.

Currently, in order to attempt to alleviate this problem, multiple solutions have been developed. Firstly, it is possible to offset the sighting axis of the instrument when the solar flux illuminates the latter directly or when it is close to it. Another technology consists in momentarily obstructing the entrance of the instrument or any other zone of the instrument affected by the solar flux so as to protect it from direct illumination.

It is also known that it is possible to develop an "athermal" system the principle of which is that deformations are applied to the bearing structure of the collecting system so as to compensate for the deformations of the collecting elements under the effect of temperature variations.

Another technique for avoiding any degradation of the instruments consists in positioning solar filters at the entrance of the system or in another zone of the instrument.

Finally, in recent space instruments, a solar baffle system is commonly implemented. A solar baffle, positioned upstream of the collecting instruments with respect to the sun, is then intended to absorb and to diffuse the solar energy, notably by way of chicanes comprising metallic materials.

However, in all cases, losses or degradations of the images and unavailabilities of the collecting elements persist. This is extremely penalizing for current observation missions.

Furthermore, generally, one and the same structure supports at one and the same time the elements charged with absorbing the solar radiation and the mirrors or other collecting instruments. This necessarily involves deformations due to the significant temperature variations. Thus, even in the case where one and the same material, typically beryllium, is used for all the structures, thereby involving homothetic deformations of these structures and therefore no maladjustment of the optics, significant drawbacks will remain:

Firstly, though homothetic, the expansion of the instruments gives rise to an increase in the image spot with respect to its focal plan and therefore a maladjustment of the instrument (the pixels of the focal plan no longer observing the same scene, but an expanded scene) and a loss of resolution.

Next, in the case of geostationary satellites, the significant temperature variations occur over a period of about a day, this constituting too short a time to allow the temperature to become uniform in all the parts. To minimize this problem, it will commonly be sought to favour the diffusion of the solar heat in the equipment by lining the internal surface of the solar baffle with mirrors. But, in this way, the risk of degradation of the optics increases greatly on account of multiple reflections of the solar radiation within the equipment. Additionally, this principle increases the stray light in the instrument.

To summarize, none of the current technologies allows the continuous use of a collecting instrument pointing in a direction close to that of the sun without risk of degradation of the instrument or its performance, notably in terms of resolution and availability.

SUMMARY OF THE INVENTION

An aim of the invention is to alleviate the aforesaid drawbacks. Thus to ensure the continuous availability, the performance and the non-degradation of collecting instruments directed towards the sun, the invention proposes the use of solar baffling thermally and mechanically insulated from the platform supporting the equipment's collecting instruments.

For this purpose, the subject of the invention is a solar protection device for space instrument comprising:
  a thermal structure comprising at least one thermal baffle intended to intercept the solar flux illuminating the space instrument,
  a plate supporting the thermal structure,
  a stabilized platform, equipped with measurement or observation instruments,
  a common platform,
  in which the said common platform supports in an independent manner the said plate and the said stabilized platform, the said thermal structure and the said stabilized platform not exhibiting any physical contact between them and consequently being mechanically decoupled, the said thermal structure and the said plate being additionally thermally decoupled by way of thermal decoupling means.

Advantageously, elements making it possible to collect, to process or to detect an electromagnetic radiation, such as collecting surfaces, diopters or mirrors, are supported and held stable by the stabilized platform.

Advantageously, the thermal baffle stores the solar flux by sensible or latent heat.

Advantageously, the thermal baffle drains off by conduction or by radiation, for example by way of heat pipes or fluid loops, the solar flux towards material surfaces, such as radiators.

Advantageously, the thermal baffle drains off by conduction or by radiation, for example by way of heat pipes or fluid loops, the solar flux towards non-material surfaces, such as an entrance surface of the solar baffle.

Advantageously, insulating spacers such as titanium sheets for example, corresponding to a first type of thermal decoupling means, ensure thermal decoupling by conduction.

Advantageously, radiative screens such as MLIs (for MultiLayer Insulation) for example, corresponding to a second type of thermal decoupling means, ensure thermal decoupling by radiation.

Advantageously, the thermal structure comprises at least two thermal baffles one of which is called a solar baffle and the other an internal baffle.

Advantageously, the solar baffle is made of aluminium.

Advantageously, the internal baffle is made of one of the following materials: aluminium, beryllium, AlBeMet$^R$, ceramic, SiC, CeSiC$^R$.

Advantageously, the solar baffle exhibits a height of about 1.6 metres.

Advantageously, the elements making it possible to collect, to process or to detect an electromagnetic radiation, such as collecting surfaces, diopters or mirrors, comprise silver or gold.

Advantageously, the common platform exhibits a length of about 1.5 metres and a width of about 1 metre.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE DRAWINGS

Figure 1:
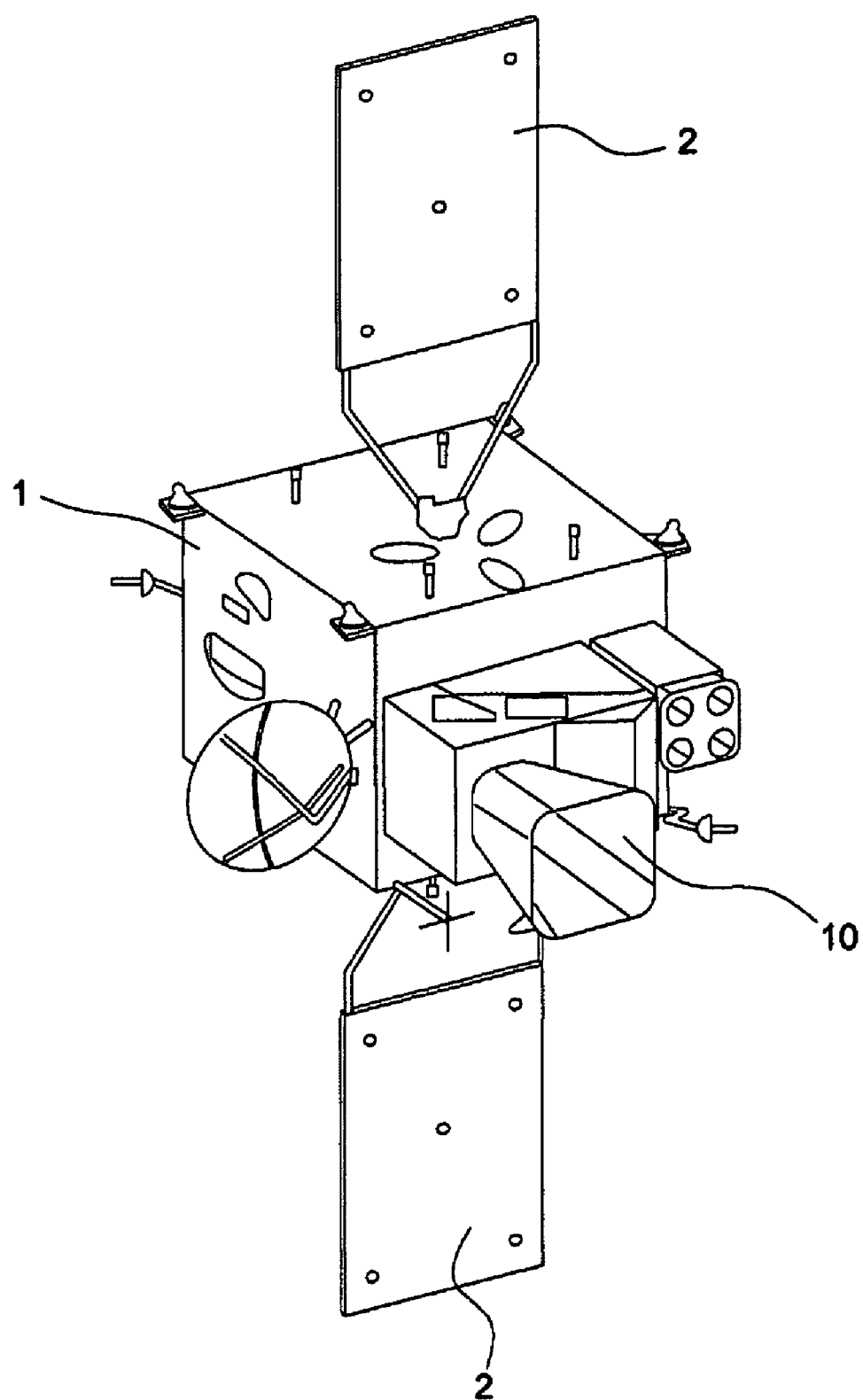
FIG. 1: the schematic view of a space instrument according to the state of the art, comprising notably a solar baffle.

FIG. 1 presents a diagram of a typical artificial satellite 1, with solar panels 2 and a solar baffle 10. This solar baffle 10 is intended to intercept the solar radiation apt to degrade the performance of the optics integrated into the satellite 1.

Figure 2:
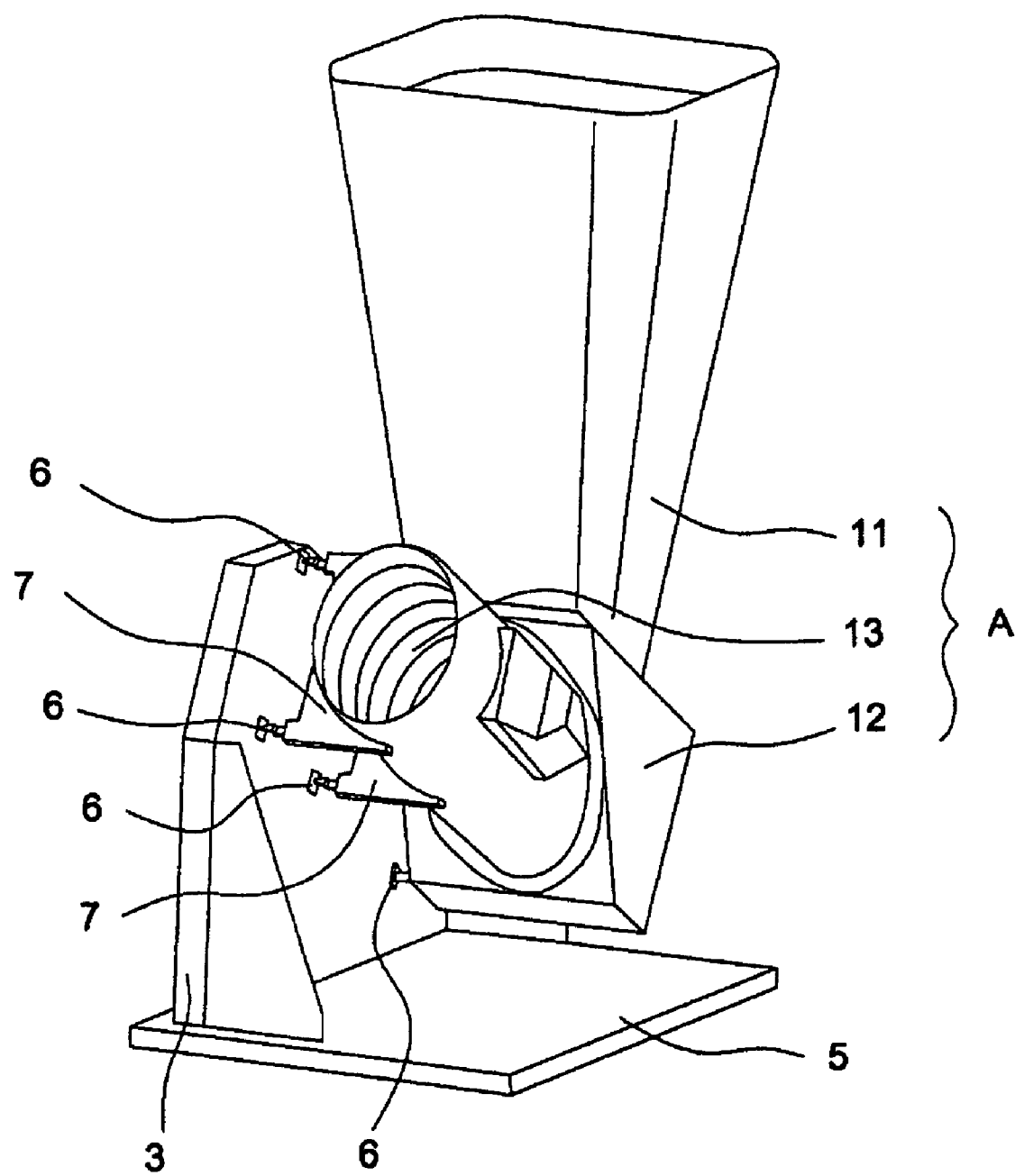
FIG. 2: the example of a structure ensuring a solely thermal function in the device according to the invention.

FIG. 2 illustrates the thermal structure A on its support, the plate 3, itself fixed to an interface plate 5, in an exemplary device according to the invention. The function of this structure A is to intercept the solar flux, to store it and to discard it. In the example of FIG. 2, this structure A is composed of three thermal baffles 11, 12 and 13. The thermal baffle 11 is called a solar baffle and the thermal baffles 12 and 13 constitute the internal baffle. These baffles are generally made of a thermally conducting material: usually aluminium for the solar baffle; usually aluminium, beryllium, AlBeMet$^R$ (produced by the company Brush Wellman Inc.), ceramic, SiC or CeSiC$^R$ (produced by the company ECM Ingenieurunternehmen für Energie-und Umwelttechnik GmbH) for the internal baffle.

Additionally, the internal baffle 12-13 can be insulated thermally from the plate 3 by way of various means, two of which are represented in the diagram of FIG. 2. Thus, in an exemplary device according to the invention, thermal decoupling by conduction is implemented by way of titanium sheets 6. These titanium sheets 6 exhibit the dual advantage of absorbing, on account of their mechanical flexibility in bending, the thermal expansion of the internal baffle 12-13, generally made of aluminium, whose thermal expansion coefficient equals 23 ppm, and of conductively insulating the internal baffle 12-13 from the plate 3 on account of a low intrinsic conductivity of titanium and a small contact area.

Furthermore, the cradles 7, which hold the thermal baffle 12 and fix it to the plate 3, also consist of relatively non-conducting material.

Figure 3:
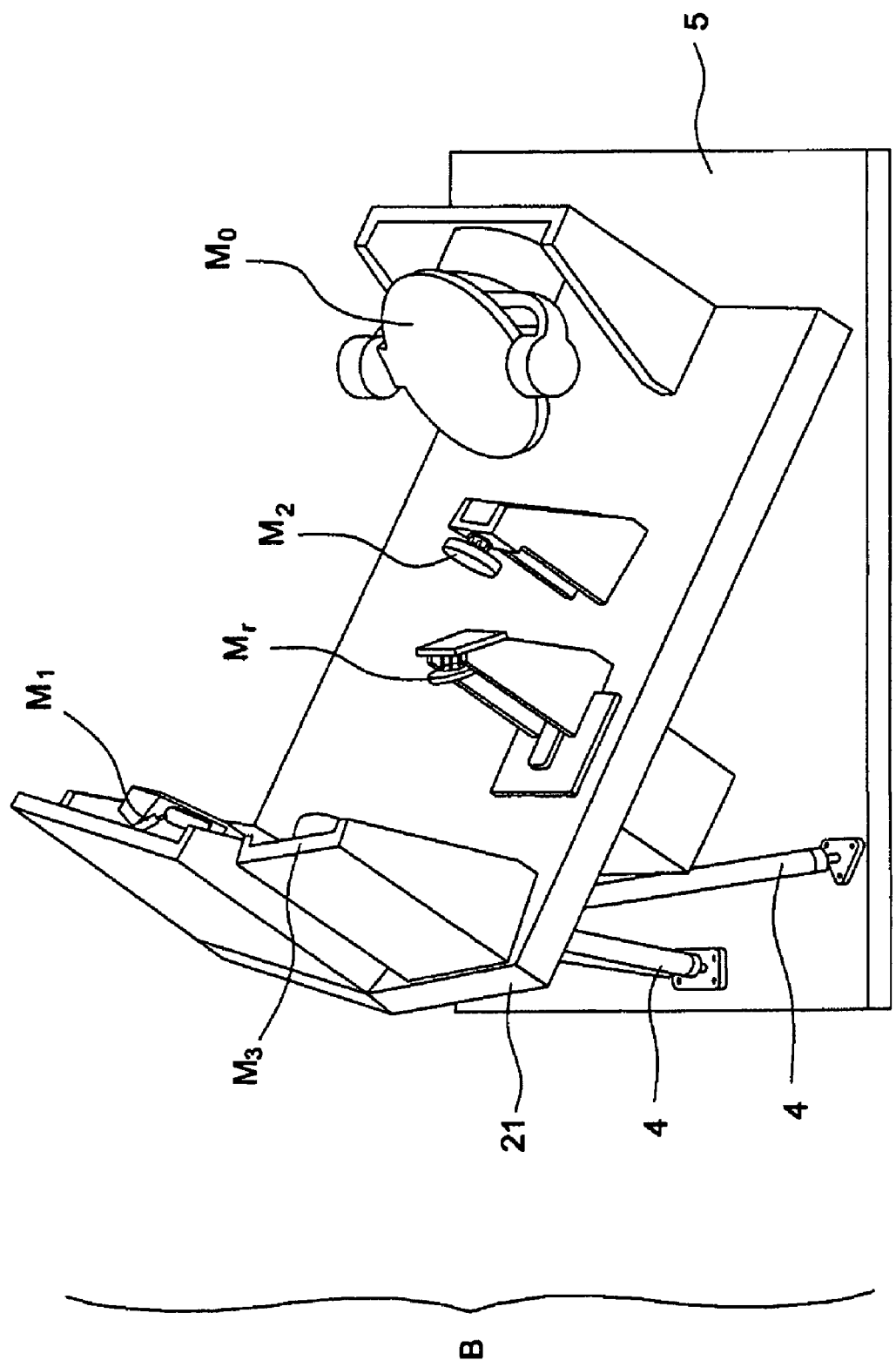
FIG. 3: the example of a stabilized platform not ensuring any thermal function in the device according to the invention.

FIG. 3 represents a diagram of the mechanically stabilized structure B on its support, the interface plate 5, in an exemplary device according to the invention. In this example, the mechanically stabilized structure B comprises optical elements whose function is to collect electromagnetic radiation. Thus, the optical platform 21, mechanically stabilized by way of stabilizing means 4, supports various optical elements that are commonly found in space observation instruments. These are the mirrors $M_0$, also called scan mirror, whose role is to determine the sighting axis of the instrument, $M_1$, whose role is to concentrate the light beam, $M_2$ and $M_3$ which serve to compensate for the optical aberrations of M1 and $M_r$, or reflecting mirror, whose function is to bend the light beam so as to direct it towards a cryostat so that it can then be analysed.

Figure 4:
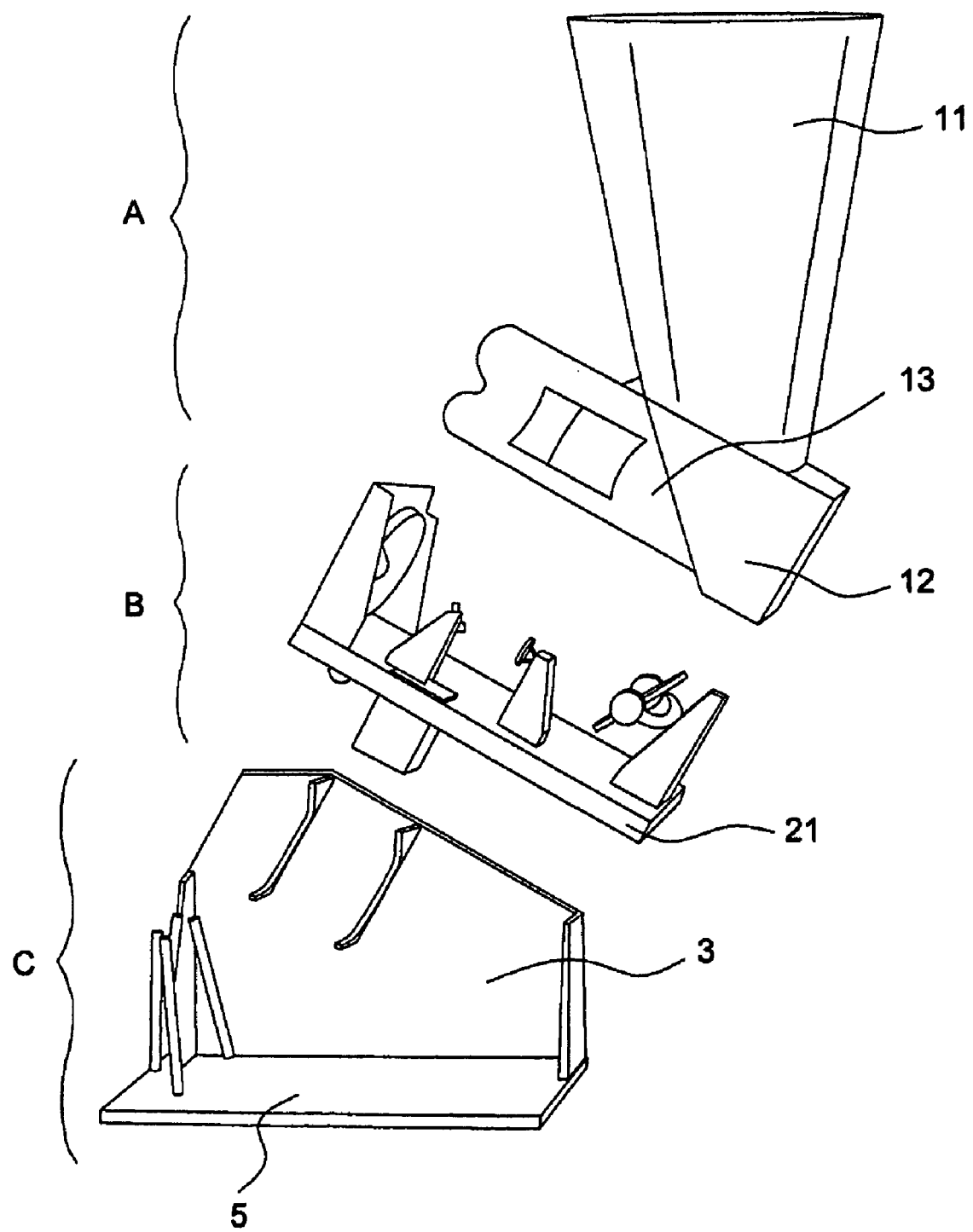
FIG. 4: the exploded view of an exemplary device according to the invention.

FIG. 4 presents an exploded schematic view of the device according to the invention. Depicted therein are the thermal structure A, the mechanically stabilized structure B and their supports grouped together in the bearing structure C. It is indeed noted that the structures A and B are independent. There is no mechanical contact between them. Thus, the thermal structure A is fixed to the support 3 of the structure C and has no contact with the plate 5 which supports the optical plate 21 mechanically stabilized by way of the stabilizing means 4. The functions of protection against solar radiation and mechanical stabilization of the collecting elements of the device are therefore totally independent. Additionally, elements such as insulating spacers or radiative screens, interposed between the structure A and the structure B enhance the thermal decoupling between these structures. In addition to the titanium sheets presented in FIG. 2 and which ensure thermal decoupling by conduction, radiative screens such as MLIs (for MultiLayer Insulation) can be placed around the internal baffle 12-13. These MLIs are in fact a succession of thermally insulating screens, often made of plastic, and comprising aluminium, which are separated by layers of clear Dacron® (trademark of the company Investa Inc.) ensuring the function of inserts. There are generally some fifteen layers in all.

Figure 5:
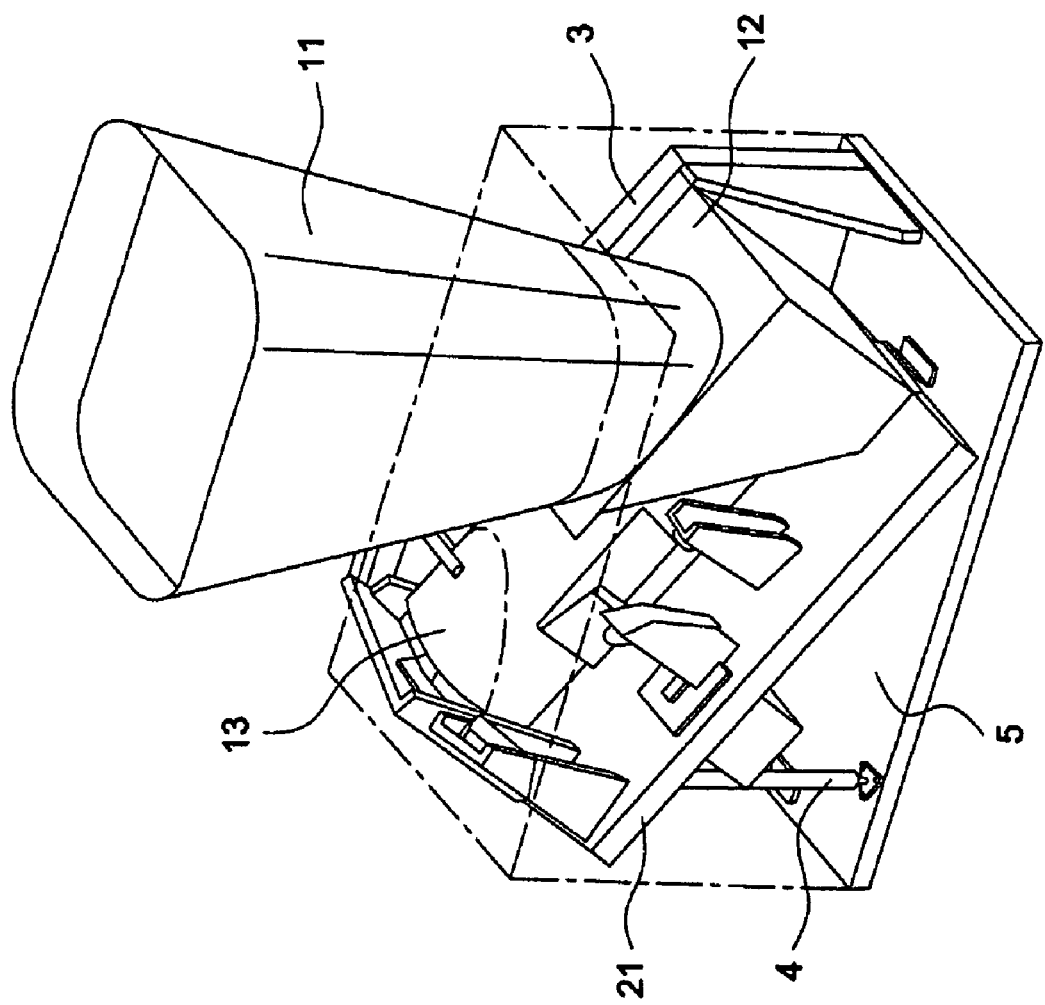
FIG. 5: the diagram of the assembly of the various structures of an exemplary device according to the invention.

FIG. 5 shows the assembly of the structures A, B and C in an exemplary device according to the invention. In this example, in addition to the scan mirror $M_0$, situated in the thermal baffle 12, at least one optic is situated in the hot cell of the internal baffle 13. The interface plate 5 typically measures 1.5 metres long by 1 metre wide; the solar baffle 11 exhibits a height of about 1.65 metres, this contrasting with the solar baffles used today. The latter are generally much smaller, exhibiting a height of about 0.5 metres. In fact, the main function of the solar baffle 11 is to reduce to the maximum the entry of solar radiation into the entrance cavity of the instrument. Its effectiveness is directly related to its height. Finally, the optics, which must not absorb radiation, are, in a preferential manner, covered with silver on their active faces, but may also be covered with gold on their active faces.

To summarize, the invention has the main advantage of allowing the continuous use of space instruments pointing in a direction close to that of the sun by decoupling the functions of solar protection and the functions of mechanical stabilization of the elements collecting electromagnetic radiation.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A satellite comprising:
a mechanically stabilized platform comprising optical elements configured to collect and analyze electromagnetic radiation;
an interface plate comprising a stabilization means, wherein the stabilization means supports the mechanically stabilized platform;
a thermal structure formed of thermally conductive material, wherein the thermal structure includes at least one thermal baffle; and
a plate supporting the thermal structure, wherein the plate is supported by the interface plate, in such a manner that there is no direct physical contact between the thermal structure and the mechanically stabilized platform, and the thermal structure is located at a first side of the mechanically stabilized platform,
a thermal decoupling means configured to thermally decouple the plate from the thermal structure,
wherein the mechanically stabilized platform and the thermal structure define a sighting axis and the sighting axis points in a direction close to the sun, incident light from the sun passes through the thermal structure to be incident upon the mechanically stabilized platform,
and the interface plate is positioned on a second side, opposite the first side, of the mechanically stabilized platform.

2. The satellite according to claim 1, wherein said thermal baffle stores the solar flux by sensible or latent heat.

3. The satellite according to claim 1, wherein said thermal baffle stores the solar flux by sensible or latent heat.

4. The satellite according to claim 1, wherein insulating spacers including titanium sheets, corresponding to a first type of said thermal decoupling means, ensure thermal decoupling by conduction.

5. The satellite according to claim 1, wherein radiative screens including MLIs (for MultiLayer Insulation), corresponding to a second type of said thermal decoupling means, ensure thermal decoupling by radiation.

6. The satellite according to claim 1, wherein said thermal structure comprises at least two of said thermal baffles one of which is a solar baffle and the other of which is an internal baffle.

7. The satellite according to claim 6, wherein said solar baffle is made of aluminium.

8. The satellite according to claim 6, wherein said internal baffle is made of one of the following materials: aluminium, beryllium, beryllium and aluminium composite material, ceramic, SiC, carbon-fiber reinforced silicon carbide.

9. The satellite according to claim 6, wherein said solar baffle has a height of about 1.6 meters.

10. The satellite according to claim 1, wherein said mechanically stabilized platform further comprises collecting surfaces, diopters or mirrors, comprise silver or gold.

11. The satellite according to claim 1, wherein said platform has a length of about 1.5 meters and a width of about 1 meter.

* * * * *